Feb. 22, 1927.
C. V. WOOLMAN
1,618,901
TWINE HOLDER
Filed Oct. 15, 1926
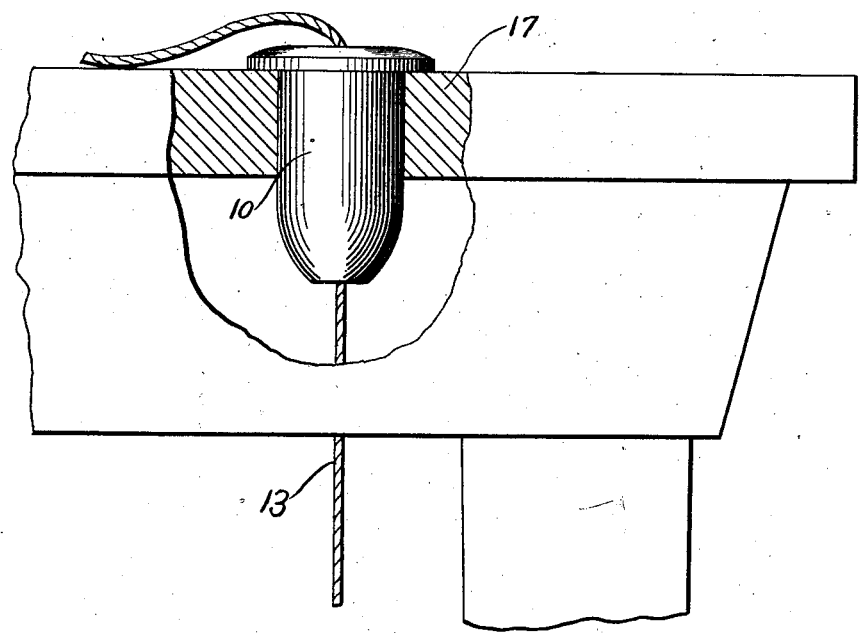
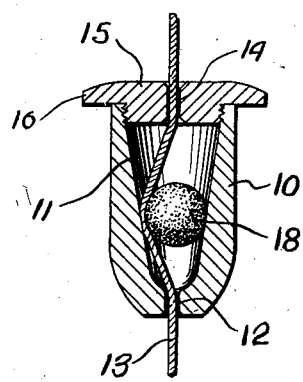
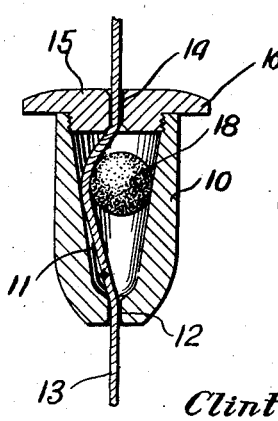
Clint V. Woolman
INVENTOR
BY Victor J. Evans
ATTORNEY
J. A. Wynn
WITNESS Patented Feb. 22, 1927.

1,618,901

UNITED STATES PATENT OFFICE.

CLINT V. WOOLMAN, OF TACOMA, WASHINGTON.

TWINE HOLDER.

Application filed October 15, 1926. Serial No. 141,772.

This invention relates to twine holders or the like, and contemplates a simple construction of a device adapted to be associated with a counter or other support, and through which twine is drawn from its source of supply, the device being constructed to prevent the twine from slipping away from the user, or becoming entangled.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a view partly in section showing the application of the invention.

Figure 2 is a vertical sectional view through the holder showing the normal position of the ball operating therein.

Figure 3 is a similar view showing the position of the ball when the twine is pulled upon for use.

Figure 4 is a bottom plan view of the holder.

The holder forming the subject matter of the present invention comprises a small receptacle 10 which may be constructed from any suitable material, and also vary in size and configuration without departing from the spirit of the invention, except that the interior wall of the receptacle is inclined toward the bottom as indicated at 11 in Figures 2 and 3. The bottom of the receptacle is provided with a restricted opening 12 through which the twine 13 enters the holder, the twine passing through the latter and also through a restricted opening 14 formed in a cover 15. This cover is formed with an annular flange 16 adapted to repose upon the top of a counter or other suitable support 17, when the holder 10 is passed through an opening provided therein for the reception of the same. Operating within the holder 10 is a ball 18, the surface of which is preferably roughened to effectively engage the twine 13 for the purpose to be presently described.

The ball of twine, not shown, is arranged at some point remote from the counter 11, the twine being unwound from the ball as its use is desired, and drawn upwardly through the holder 10 in the manner shown and described. When the twine is pulled upon for use, the ball 18 is lifted from the position shown in Figure 2 to the position shown in Figure 3, in which position it allows the twine to be drawn freely through the holder. After the twine has been released by the user, the ball 18 gravitates to the position shown in Figure 2, in which position it impinges the twine therebetween and the wall 11 of the holder, and prevents the twine from slipping downwardly through the latter as will be readily understood. By use of the invention twine can be more conveniently handled by storekeepers and the like without any possibility of the twine becoming unnecessarily loosened from the ball or entangled about the counter, which frequently occurs where a ball of twine is supported upon the top of the counter for use. Furthermore the invention is very simple in construction and can be manufactured and sold at a nominal cost.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A twine holder comprising a receptacle having its inner wall tapered toward the bottom thereof, said bottom being provided with a restricted central opening through which the twine enters the holder, a cover for said holder having a restricted central opening through which the twine passes from the holder, an annular flange formed on the cover and projecting beyond the body portion of the receptacle for the purpose specified, and a roughened ball arranged within the holder and normally occupying a position to impinge the twine against the wall thereof for the purpose specified, said ball being lifted by the twine incident to a pull upon the latter, to permit the twine to be freely drawn from the holder.

2. The combination with a support having an opening therein, of a twine holder comprising a receptacle having its inner wall tapered toward the bottom, said bottom having a restricted opening through which the twine enters said holder, said holder being adapted to be passed through said opening in the support, a cover threaded on said holder and including an annular flange adapted to repose upon the support, said cover having a restricted opening through which the twine passes from the holder, and a roughened ball loosely mounted upon the holder for the purpose specified.

In testimony whereof I affix my signature.

CLINT V. WOOLMAN.